(No Model.)

S. B. OPDYKE.
EYEGLASS FRAME.

No. 311,602. Patented Feb. 3, 1885.

WITNESSES:
J. W. Reynolds
W. R. Haight

INVENTOR
Stacy B. Opdyke
BY W. H. Babcock
ATTORNEY

UNITED STATES PATENT OFFICE.

STACY B. OPDYKE, OF NEW HAVEN, CONNECTICUT.

EYEGLASS-FRAME.

SPECIFICATION forming part of Letters Patent No. 311,602, dated February 3, 1885.

Application filed October 20, 1884. (No model.)

*To all whom it may concern:*

Be it known that I, STACY B. OPDYKE, a citizen of the United States, residing at New Haven, county of New Haven, and State of Connecticut, have invented new and useful Improvements in Eyeglasses, of which the following is a specification.

This invention relates to eyeglasses and spectacles, and is an improvement upon the device described and shown in my prior Patent No. 265,626.

The said invention consists in the combination of two longitudinally-grooved plates or fastening-pieces with the nose-pads and the bow, these plates or pieces being arranged behind the lower parts of the bow, or supplemental plates or springs corresponding to said lower parts, and receiving and holding the edges of the cork sheets which constitute the pads.

Figure 1:
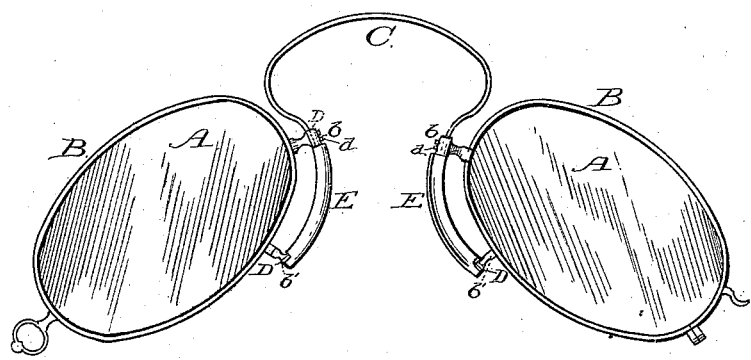
Figure 2:
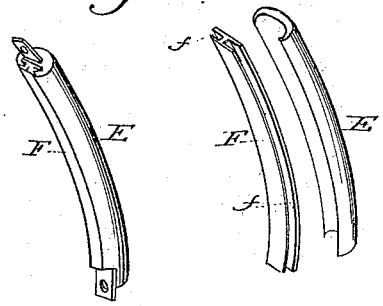

In the accompanying drawings, Figure 1 represents an elevation of a pair of eyeglasses embodying my invention. Fig. 2 represents detail views of one of the side springs, the corresponding fastening-piece, and the pad secured thereby.

A designates the lenses of the eyeglasses; B, the frames for said lenses, and C the bow, which is secured to the upper lugs, $b$, of said frames. From said upper lugs to the lower lugs, $b'$, the side pieces, D, extend, these side pieces being plates or springs adapted to fit against the sides of the nose and be held there by the pressure of the bow. They are often made integral with the latter, but I have illustrated them as in separate pieces held to the frames by the same screws, $d$, which hold said bows, and slotted to allow a certain amount of play over or past the latter.

E designates the nose-pads, which fit around these side pieces and are held against the sides of the nose. Each of these pads consists of a flexible sheet, preferably of cork, which has its edges folded back behind one of the side plates or springs, D, and inserted into the grooved sides of a fastening-piece, F, which sets against the rear face of the said side plate. Each of these fastening-pieces is grooved on each side from end to end, (the grooves being marked $f$,) thin plates being left between the grooves and the front and rear faces, respectively, and also as a partition down the middle of the piece. After the edge of the pad is inserted into the grooves of the fastening-piece the thin lips or plates which form the walls of the groove may be clamped thereupon, holding the pad in place. The pad in turn keeps the fastening-piece in place, although the latter may have additional means of attachment to the side spring or side plate.

The above-described means of attachment of the pad allows the latter to be easily removed when worn out or soiled, and facilitates the substitution of a new one, although it holds the pad very firmly against accidental displacement.

Having thus described my invention, what I claim as new, and desire to secure by Letters Patent, is—

1. A fastening-piece, F, having longitudinal grooves in its sides, in combination with the side pieces of an eyeglass-bow, and pads which fold around said side pieces and enter said grooves, substantially as set forth.

2. In combination with an eyeglass-bow and side springs or plates, a pair of flexible sheets which fold around said springs to form nose-pads, and a pair of fastening-pieces arranged behind said side springs, respectively, and clamped on the edges of said pads to hold the same, substantially as set forth.

In testimony whereof I have hereunto set my hand in the presence of two subscribing witnesses.

STACY B. OPDYKE.

Witnesses:
ALFRED BERNHEIM,
MAX BAYERSDORFER.